(12) United States Patent
Chatterjee et al.

(10) Patent No.: US 11,824,725 B2
(45) Date of Patent: Nov. 21, 2023

(54) STATE MACHINE EMULATION USING DOMAIN-SPECIFIC LANGUAGE CONSTRUCTS

(71) Applicants: Samir K. Chatterjee, New Providence, NJ (US); Kuntal Bhattacharya, Kolkata (IN)

(72) Inventors: Samir K. Chatterjee, New Providence, NJ (US); Kuntal Bhattacharya, Kolkata (IN)

(73) Assignee: Rebaca Technologies, Santa Clara, CA (US)

( * ) Notice: Subject to any disclaimer, the term of this patent is extended or adjusted under 35 U.S.C. 154(b) by 296 days.

(21) Appl. No.: 17/021,632

(22) Filed: Sep. 15, 2020

(65) Prior Publication Data

US 2021/0297318 A1    Sep. 23, 2021

Related U.S. Application Data

(60) Provisional application No. 62/990,530, filed on Mar. 17, 2020.

(51) Int. Cl.
| | | |
|---|---|---|
| *H04L 41/12* | (2022.01) | |
| *G06F 9/455* | (2018.01) | |
| *H04W 24/06* | (2009.01) | |
| *G06F 11/34* | (2006.01) | |
| *H04W 24/10* | (2009.01) | |

(52) U.S. Cl.
CPC .............. *H04L 41/12* (2013.01); *G06F 9/455* (2013.01); *G06F 11/3419* (2013.01); *G06F 11/3466* (2013.01); *H04W 24/06* (2013.01); *H04W 24/10* (2013.01)

(58) Field of Classification Search
None
See application file for complete search history.

(56) References Cited

U.S. PATENT DOCUMENTS

| | | | |
|---|---|---|---|
| 8,126,696 B1 * | 2/2012 | Faraboschi | G06F 30/20 703/22 |
| 10,691,580 B1 * | 6/2020 | Kasat | G06F 11/364 |
| 2011/0242996 A1 * | 10/2011 | Zhu | H04L 41/145 370/252 |
| 2012/0150521 A1 * | 6/2012 | Balkwill | H04W 16/22 703/13 |
| 2014/0330536 A1 * | 11/2014 | Chen | G06F 9/46 702/181 |

(Continued)

*Primary Examiner* — Chi H Pham
*Assistant Examiner* — Raul Rivas
(74) *Attorney, Agent, or Firm* — Louis S. Horvath

(57) ABSTRACT

A method for testing network interaction defines a set having a plurality of network nodes, wherein the network nodes within the set are in signal communication with each other and wherein at least one of the network nodes is emulated by a processor. A set of transactions between network nodes is defined by repeated steps of defining a request message for message transfer between at least a first node and a second node; and defining, for each request message, at least one corresponding response message for transfer between the second node and the first node. The method executes the defined set of transactions and tracks and records performance data from the set of network nodes participating in the set of transactions, and displays the recorded performance data.

10 Claims, 14 Drawing Sheets

(56) References Cited

U.S. PATENT DOCUMENTS

| | | | |
|---|---|---|---|
| 2016/0197803 A1* | 7/2016 | Talbot | H04L 43/08 |
| | | | 709/224 |
| 2016/0277510 A1* | 9/2016 | Du | H04L 43/50 |
| 2019/0312910 A1* | 10/2019 | Convertino | G06F 16/254 |
| 2019/0324929 A1* | 10/2019 | Kumar | G06F 12/0238 |

* cited by examiner

```
when I send S1AP message S1_SETUP_REQ on interface S1-MME with the
following details from node eNodeB1 to MME:
| parameter                                         | value
|
| global_enb_id.plmn_identity.mcc                   | 208
|
| global_enb_id.plmn_identity.mnc                   | 93
|
| global_enb_id.macro_enb_id                        | 3584
|
| enb_name            |
eNB_LTEBox
| supported_tas_list.0.tac                          | 1
|
| supported_tas_list.0.broadcast_plmns.0.plmn_identity.mcc | 208
|
| supported_tas_list.0.broadcast_plmns.0.plmn_identity.mnc | 93
|
| paging_drx                                        | 128
|
```

*FIG. 3A*

Then I receive and validate S1AP message S1_SETUP_RES on interface S1-MME with the following details on node eNodeB1 from MME:

| parameter | value |
|---|---|
| served_gummeis_list.0.served_plmns.0.plmn_identity.mcc | 208 |
| served_gummeis_list.0.served_plmns.0.plmn_identity.mnc | 93 |
| served_gummeis_list.0.served_group_ids.0.mme_group_id | 4 |
| served_gummeis_list.0.served_mmecs.0.mme_code | 1 |
| relative_mme_capacity | 10 |

FIG. 3B

When I send SIAP message S1_SETUP_REQ on interface S1-MME with the following details from node eNodeB1 to MME:

| parameter | value |
|---|---|
| global_enb_id.plmn_identity.mcc | 208 |
| global_enb_id.plmn_identity.mnc | 93 |
| global_enb_id.macro_enb_id | 3584 |
| enb_name | eNB_Eurecom_LTEBox |
| supported_tas_list.0.tac | 1 |
| supported_tas_list.0.broadcast_plms.0.plmn_identity.mcc | 208 |
| supported_tas_list.0.broadcast_plms.0.plmn_identity.mnc | 93 |
| paging_drx | 128 |

Then I receive and validate SIAP message S1_SETUP_REQ on interface S1-MME with the following details on node eNodeB1 from MME:

| parameter | value |
|---|---|
| served.gummeis_list.0.served_plmns.0.plmn_identity.mcc | {string:eq}(208) |
| served.gummeis_list.0.served_plmns.0.plmn_identity.mnc | {string:eq}(93) |
| served.gummeis_list.0.served_group_ids.0.mme_group_id | {string:eq}(4) |
| served.gummeis_list.0.served_mmecs.0.mme_code | {string:eq}(1) |
| relative_mme_capacity | {string:eq}(10) |

| Procedure | Authentication (AKA) | | Default EPS Bearer Context... | | Initial Context Setup | |
|---|---|---|---|---|---|---|
| S1-SETUP | Types | 1 | Types | 2 | Types | 2 |
| Types 1 | Quality | 0% | Quality | 50% | Quality | 50% |
| Quality 0% | | | | | | |

FIG. 9D

| Scenario | Initial attach w IMSI and PDN connectivity request | | S1 Setup Request – After Attach | |
|---|---|---|---|---|
| Configurable amount of GTP-U traffic | Occurrence | 3 | Occurrence | 1 |
| Occurrence 10 | Quality | 100% | Quality | 0% |
| Quality 30% | | | | |

STATE MACHINE EMULATION USING DOMAIN-SPECIFIC LANGUAGE CONSTRUCTS

CROSS REFERENCE TO RELATED APPLICATIONS

This application claims the benefit of U.S. Provisional Application Ser. No. 62/990,530 entitled "STATE MACHINE EMULATION USING DOMAIN-SPECIFIC LANGUAGE CONSTRUCTS" in the names of Samir K. Chatterjee et al., filed 17 Mar. 2020 and incorporated herein in its entirety.

FIELD OF THE INVENTION

The present disclosure relates to methods and utilities for network applications testing and more particularly to methods for automated testing related to interoperability of network applications at each of a set of network nodes.

BACKGROUND OF THE INVENTION

Interoperability of network applications allows a user to interact with a cloud or server application seamlessly, without requiring special installation setup or procedures that are tailored to the specifics of a particular network. Testing and validating interoperability can be a demanding task, particularly as advances in networking technologies make it necessary to continually upgrade both hardware and software and as improvements in networking speed and capabilities accelerate. Currently, the advent of 5G network capability has made it clear that the problem of automated testing must be addressed in order to smooth and speed up adaptation of enhanced networking.

Efficient and accurate transfer of information signals between network nodes and related applications are particular areas of concern. Thorough testing is required to ensure that all variations of a message, under all operational conditions, for all information elements of the message, are properly implemented by the software involved in a message exchange. This testing process becomes challenging when one needs to take into account the entire set of message signals that are involved to satisfy the testing requirement of an application software. The person involved in testing the application must understand all the details of all the messages as per the different standard specifications and must update this knowledge whenever there are any modifications to the specifications. In addition to the knowledge of the specification, one has to understand how to test different load conditions and collect performance data for analysis.

Using conventional methods, validation of message exchange for an application that involves multiple computers distributed across several different network technologies can be a daunting task. Testing of such software becomes extremely difficult and it requires one to understand several different protocol specifications. Further, in an environment of fast-paced innovation, new standards are continuously created to enable computers connected to one network to communicate with another computer on a completely different network, sometimes using vastly different network technology. Even more demanding is the task of validating an end-to-end message exchange involving several other computers and networks participating at interim points in the transmittal process. The level and depth of knowledge required to validate such an application requires expertise that is very rare and requires constant update.

Testing a complex application using conventional methods requires a large team of knowledgeable people who are intimately familiar with all the details of all the messages that are exchanged between all the software running on different computers involved in the application. This is extremely challenging and keeping this entire team updated with fast paced technology innovation has become difficult. End-to-end test cases, i.e. solution-level test cases, of applications that are used for building networking solutions are impacted, mostly because this involves knowledge of multiple different protocols in order to write any test case.

In the classical state-machine model, any system or system node is typically in an Idle state until an event occurs. Events themselves can be external or internal with respect to the system. Each system has an Idle state and transitions from Idle state on receiving message signals from other external systems. Once out of Idle state, the system executes a set of actions and interacts with other connected systems until it is restored to Idle state. The state transition sequence characterizes a particular behavior of the system that can be represented by a small State Machine. A collection of such state transition sequences for each node forms the complete State Machine of the system. How a particular state machine transitions through different states in such small state machines or sequences can be defined by a set of behaviors or scenarios. Scenarios, also referred to as Call Flows, are dictated by the standard-based specification for a network.

Any computer system that provides a well-defined service essentially can be considered to act as a finite state machine for its implementation. The system transitions through different states in order to provide a service. Each external message that is received by the system causes a corresponding state transition in the system. The finite number of states of the machine can be augmented or deprecated as required in order to efficiently deliver the service for which the machine is responsible. The changes in the state machine are mostly due to new external messages that are defined as the software is developed through its different versions. From this perspective, small subsets of external messages to the system can be represented as sub-state-machines with characteristic scenarios or behavior sets. These external messages to the system are defined by standards bodies like 3GPP (3rd Generation Partnership Project).

Test emulation provides a particular challenge for testing and validating network applications. In conventional practice, it is common to set up the complete state machine of the real nodes for emulations. While such an approach is feasible, it does not address the problem of rapid development of the emulation system. Moreover, the adaptability of the emulated system to support future requirements is greatly reduced. Furthermore, the conventional approach is not integrated with a test orchestrator that is aware of the test being executed, integrated with the test data repository, and conscious of the DUT (device under test) behavior being validated. In order to support future requirements in the rapidly changing 3GPP cellular world, a more agile set of tools is needed, one that is capable of supporting future requirements without requiring substantial changes to software architecture.

SUMMARY

It is an object of the present disclosure to advance the art of testing network applications. An embodiment of the present disclosure provides improved methods for system emulation for testing each network node using a set of natural language constructs.

These objects are given only by way of illustrative example, and such objects may be exemplary of one or more embodiments of the invention. Other desirable objectives and advantages inherently achieved may occur or become apparent to those skilled in the art. The invention is defined by the appended claims.

According to an aspect of the disclosure, there is provided a method for testing a system comprising:
(a) defining a plurality of network nodes, wherein the network nodes are in signal communication with each other and wherein at least one of the network nodes is emulated by a first processor;
(b) defining a set of message signal transactions between network nodes by repeated steps of:
   (i) defining a request message signal for message transfer between at least a first node and a second node; and
   (ii) defining, for each request message, at least one corresponding response message signal for transfer between the second node and any other network node;
(c) executing the defined set of message signal transactions between network nodes;
(d) tracking and recording performance data from the network nodes participating in the set of transactions; and
(e) rendering the recorded performance data on a display that is in signal communication with the network.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

FIG. 3A shows an exemplary language construct that can be used to send an external message from one node to another.

FIG. 3B depicts exemplary behavior upon sending or receiving a message from a source and destination node.

FIG. 7 shows exemplary language constructs.

FIG. 9C is an exemplary display that reports procedural results for various steps in an exemplary test sequence.

FIG. 9D is an alternate display example that applies to a particular operation or "scenario".

DETAILED DESCRIPTION OF THE EMBODIMENTS

Figure 1:
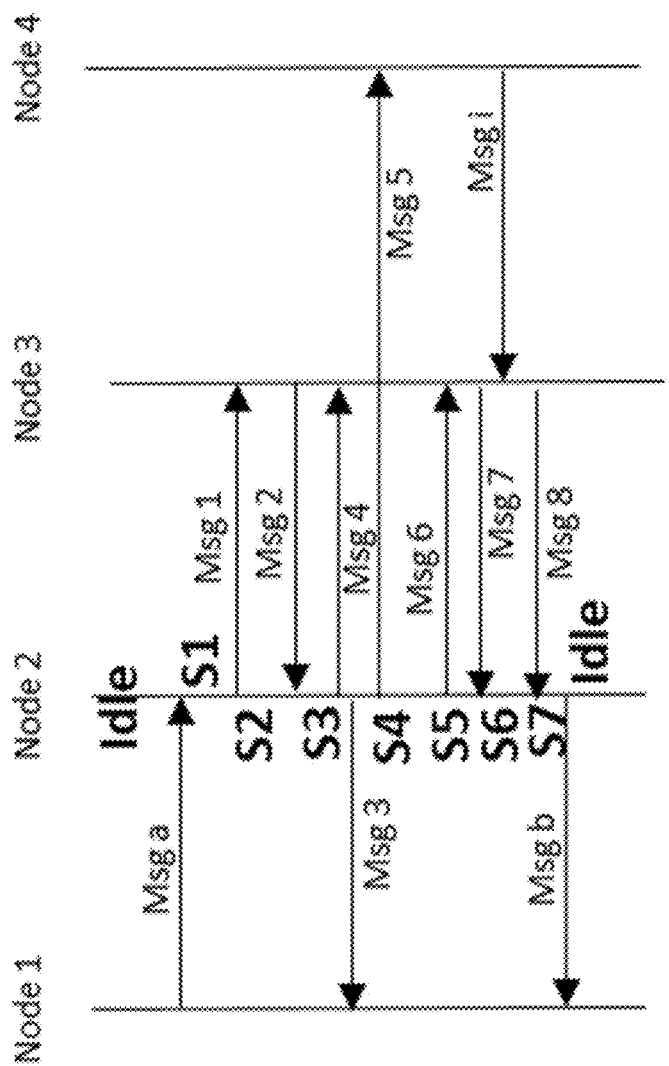
FIG. 1 shows an exemplary mapping of state transitions during interaction between various network nodes.

The following is a detailed description of the preferred embodiments, reference being made to the drawings in which the same reference numerals identify the same elements of structure in each of the several figures.

In the drawings and text that follow, like components are designated with like reference numerals, and similar descriptions concerning components and arrangement or interaction of components already described are omitted. Where they are used, the terms "first", "second", and so on, do not necessarily denote any ordinal or priority relation, but are simply used to more clearly distinguish one element or grouping of elements from another.

The phrase "in signal communication" as used in the application means that two or more devices and/or components are capable of communicating with each other via signals that travel over some type of signal path. Signal communication may be wired or wireless. The signals may be communication, power, data, or energy signals which may communicate information, power, and/or energy from a first device and/or component to a second device and/or component along a signal path between the first device and/or component and second device and/or component. The signal paths may include physical, electrical, magnetic, electromagnetic, optical, wired, and/or wireless connections between the first device and/or component and second device and/or component. The signal paths may also include additional devices and/or components between the first device and/or component and second device and/or component.

The term "set", as used herein, refers to a non-empty set, as the concept of a collection of elements or members of a set is widely understood in elementary mathematics. The term "subset", unless otherwise explicitly stated, is used herein to refer to a non-empty proper subset, that is, to a subset of the larger set, having one or more members. For a set S, a subset may comprise the complete set S. A "proper subset" of set S, however, is strictly contained in set S and excludes at least one member of set S.

Each network "node" has, or is related to, a computer or other type of processor.

In domain-driven design, the structure and language of the software design corresponds to the environment or domain. A domain-specific language (DSL) is a specialized computer language used to provide specific functions or to handle a well-defined set of functions within a particular applications environment. Examples of well-known DSLs include HTML (hypertext markup language) and SQL (structured query language) used for database access.

The phrase "language constructs" as used in the present disclosure relates to operator-generated instructions used in test case setup and execution for configuring network nodes for simulating message exchange. A natural language construct has a limited vocabulary that uses expressions that can be phrased in spoken language terms. The natural language construct can be essentially a sentence having conventional subject-verb-object construction.

FIG. 1 shows an exemplary mapping of state transitions during interaction between various network nodes, shown as Nodes 1, 2, 3, and 4 in a typical message exchange. States S1-S7 are shown for Node 2; similar state changes would apply for the other nodes in this exchange sequence.

Figure 2:
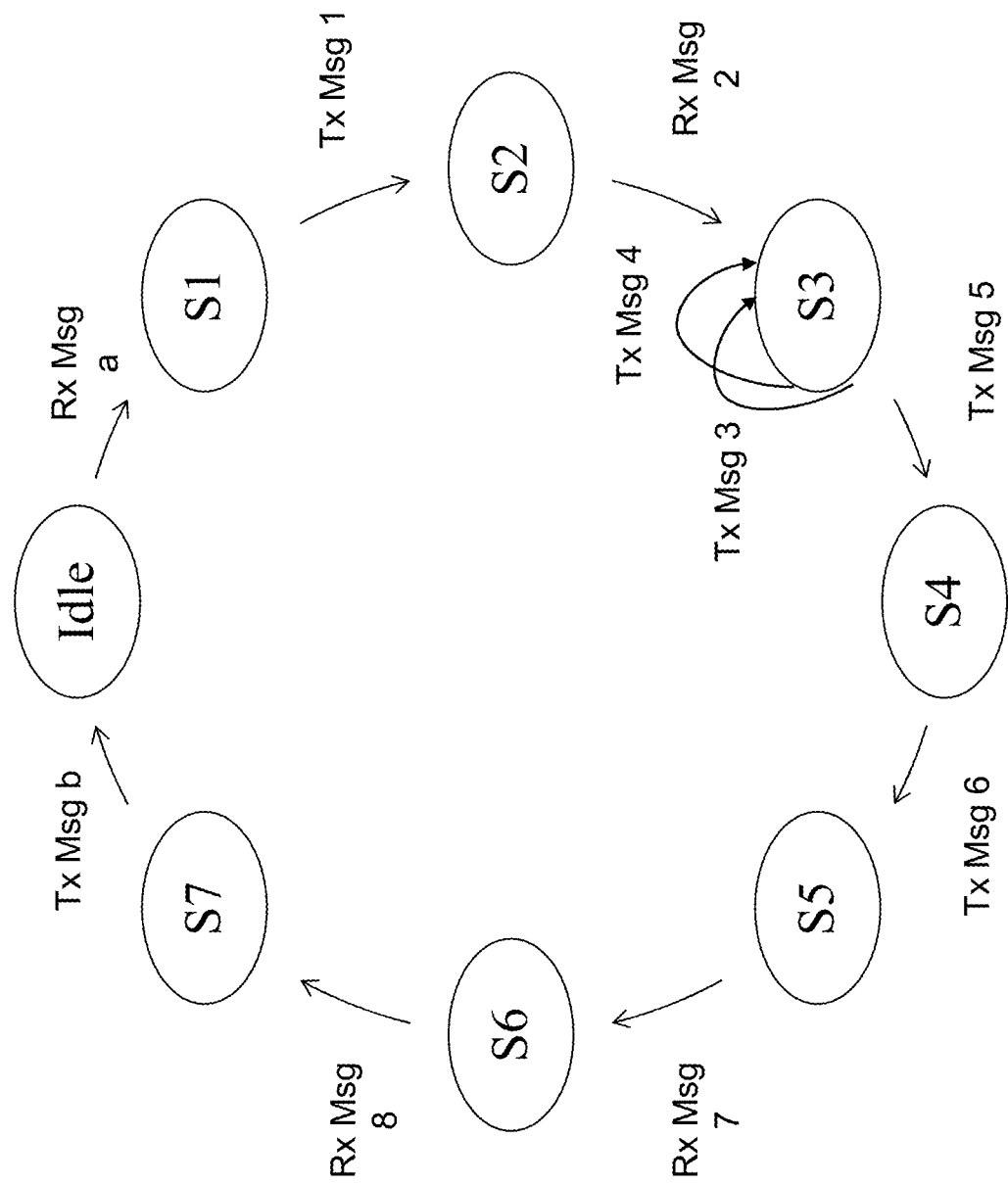
FIG. 2 is an exemplary machine state diagram for handling a message sequence.

FIG. 2 is an exemplary machine state diagram for Node 2 handling of the message sequence shown in FIG. 1. The state diagram illustrates the following sequence of transitions as the message signals are conveyed from node to node:
  (i) At receipt (Rx) of message signal Msg a, Node 2 transitions from an Idle state to state S1.
  (ii) Node 2 transmits (Tx) message Msg 1 to Node 3 and changes to state S2.
  (iii) Upon receiving Msg 2 from Node 3, Node 2 moves to state S3.
  (iv) in State S3, Node 2 transmits messages Msg 3 and 4 to Nodes 1 and 3 respectively, then transmits message Msg 5 to Node 4 and transitions to state S4.
  (v) Node 2 sends message signal Msg 6 to Node 3 and changes to state S5.
  (vi) Message Msg 7 is received from Node 3 and Node 2 changes to state S6.
  (vii) Message signal Msg 8 is received from Node 3, causing Node 2 transition to state S7.
  (viii) Node 2 transmits message Msg b to Node 1, then returns to its Idle state.

Transition state changes at different nodes can happen simultaneously.

Embodiments of the present disclosure can provide the same message pattern and interactions, but without requiring setup of state machine logic for testing the exemplary network interaction sequence shown. Instead, a small set of domain-specific language constructs can be used to specify and track the behavior exhibited in FIG. 1.

Computer Systems are designed with the help of standardized external messages that send and receive information signals between the nodes of the system. An external message of a system determines the intent of the node that is sending or receiving an external message signal. Behavior of the different nodes of the system is emulated in order to test the system in its entirety. As shown in the simplified example of FIGS. 1 and 2, behavior of the system can be depicted using a sequence of external messages to the system and observing how the system reacts to them.

In order to build a complex system of computer nodes, there is a need to configure the emulation of the different nodes in order to validate the implementation of each node in the system while they are being developed. Emulation of the complete system of computer nodes should be limited to testing the system, as opposed to forming a scaled-down version of the real system of computer nodes.

The emulated behavior of the computer nodes needs to be set up rapidly, so as to represent the larger parts of the system before the actual system is completely built. At times, it is required to have partial implementation of a node being tested, emulating only a portion of the state machine while the actual node being developed has the balance sequences of the real State Machine.

The need for emulation of the computer nodes is to model the behavior and overall design of actual computer nodes themselves. Further if the state machine of the actual node being developed is complex, rapid emulation of certain portions of the state machine can easily be done simply by implementing the external messages and the information element contained in those messages. Such complexity of the node state sequences can be modelled as a sequence of multi-parameter functions that represent the behavior of the node and its time domain based on the value of the parameters, i.e. information elements. In many cases the values from previous states, and details of the events received at that time, have both deterministic and probabilistic impact on that function.

In the case of a cloud-based solution, apart from the functional requirements, the emulated solution must be compatible with cloud technologies in order to emulate the computer node in a truly cloud-native environment. Such capabilities should allow the emulated node to provide high load characteristics in terms of session volume and individual session throughput.

In order the meet the criteria for emulation of a cloud-native solution, the emulated system should have the following characteristics:
1) Aids in the rapid development of the resultant real system of computer nodes. Ability to emulate certain portions of the node specification and work seamlessly with the DUT (device under test) is a definite plus.
2) Considers the system of external message signals between the nodes in its entirety; possibly following a predefined standard specification that is agreed upon by those building the system.
3) Able to integrate new protocol stacks and their messages at a rapid rate, so as to emulate external behavior quickly and effectively.
4) Capable for employing existing computer network protocol standards that are pre-requisites for communication between the nodes i.e. TCP/IP.
5) Compatible with transport technologies such as DPDK (Data Plane Development Kit) and SR-IOV (single root input/output virtualization) for meeting current load expectations.
6) Cloud capability for handling micro-services and auto scaling.
7) Capable to provide feedback in the form of benchmark KPIs (key performance indicators) that are to be used to build the actual system.

The scope of implementation can be considered at a micro and/or macro level for any system or node and software module with well-defined APIs that are messages. This method of emulation enables visualizing a system in its entirety before actually building the system itself. The emulated system can then be used as a tool to test the actual system. Parts of the emulated system should be capable of replacing different nodes of the real system or replacing the entire system itself.

Protocol stacks, such as those defined by 3GPP, define the external behavior of computer nodes that belong to a larger system that provides worldwide cellular phone service. 3GPP specifications describe the external behavior of computer nodes in the system. These systems and their specified external behavior are suitable candidates for emulation. With rapid ongoing changes in 3GPP specifications, there is need for an emulation system having the capabilities for emulating specified model behavior described above to aid in the development of a larger system, such as a system handling worldwide cellular service.

Emulations of the real system need to be more capable and exhaustive than the actual system with relation to external behavior of the real system and should have the ability to generate large workloads to test the actual system and model its specified behavior. This requirement is significant from the point of view of testing the functionality as well as performance of the actual system before it is built. This demand requires proper design of the emulator which may not be ideally suited for resources and budget allocated towards node emulation.

Emulations of the actual system should be able to provide vital information about the emulated system in the form of KPIs (key performance indicators). This type of feedback is required in order to implement the resultant system, as this serves as the basis of the functional and performance requirements of the resultant system and analysis for Machine Learning.

According to an embodiment of the present disclosure, the correlation of node behavior at the system level, the network behavior of the associated cloud resources, and utilization of the infrastructure level resources (measured through KPIs) can be represented by a BDD (Behavior-Driven Development)-based features file.

Natural Language Constructs in BDD

Behavior Driven Development (BDD) is based on natural language constructs. BDD uses simple keywords like "Given, When, Then" to define system behavior. For example, "given" defines the initial context or "pre-condition" of the application state and environment; "when" identifies the "test step" or the event or actions along with the payload (specific message detail) that needs to be carried out, sent, or published; and finally, "then" specifies the expected outcome of the action and verifies the response output along with the message detail. In some cases, "when" can specify the message request to be sent and "then" validates the actual response against the expected response, without "given".

BDD also defines some grammars for generating the constructs to be used along with the keywords to form an English-like sentence for defining the message interactions that is easy to use. With the constructs appropriately tuned, by those having sufficient domain understanding to make it intuitive for a particular application, training for human and machine functions can be performed more efficiently. These constructs are specified to uniquely identify the behavior of the particular application/solution.

Constructs can be extended to support new business requirements that cannot be addressed by the existing set. However, extending the construct needs to be done carefully so that it does not increase the dictionary of constructs unnecessarily, thus making it difficult to remember. The requirement for such an extension or the design needs to guard that the dictionary of constructs not expand unnecessarily and not require constant modifications whenever a specification of a message changes or an additional information element is added to a message. This activity is carried out by the framework development team only.

Using these simple keywords and constructs, one can define any of a number of types of interaction between two software modules and perform deep packet inspection of all communications between the modules. By chaining such definitions, one can validate the behavioral interaction between multiple different software components running on several computers on networks distributed along the network, even distributed across the world.

According to an embodiment of the present disclosure, the applicants' proposed automation solution uses three basic keywords and a limited set of domain specific constructs to build a natural language user interface. Ability to test a message using natural language like English, in a manner specific to the application domain, helps to make it straightforward to learn and to implement this automation framework.

Feature Files in BDD

Since they test product features, test scripts written using BDD are also called "feature files". The "given-when-then" constructions within the script specify how the product will behave, e.g. given the context, when the action is completed, product behavior is as specified. Ensuring that the domain knowledge is built into the constructs used enables anyone familiar with the domain (e.g. test engineer, domain expert and customer) to compose a test automation script with minimal training. The user focuses on the message to be transferred and the information element of the message that needs to be validated. Using BDD keywords and domain-specific constructs, personnel setting up a particular test sequence can declare the pre-condition of the software state and the environment, the message that needs to be sent with the parameters of interest, and the validation criteria for the expected response.

Correlated data for different behavior of complex nodes can be effectively input to different machine-learning (ML) models to extract various insights. A deep neural network ML model can be readily trained from correlated behavioral data that can be broken down into syntax. This method of training can be particularly effective for system model development, since it can use model test data in scenarios that become progressively more complex.

Incremental System Definition

Emulations need to be built quickly and reliably in order to build and test an actual system. The Applicants' solution uses miniature language constructs that define the system incrementally, so that the system can be built in stages for currently known features and can be augmented to cover additional functionality. The language constructs need to identify the external messages that define the external behavior of the different nodes of a network. The language constructs need to have attributes that define the characteristics of the application protocols. The constructs must also have variable parts that can be used to model different aspects of the application protocol without having to create a large dictionary of constructs. In the present disclosure, the 3GPP specification of a cellular network is used as one example that illustrates the proposed solution.

FIG. 3A shows an exemplary language construct that can be used to send an external message signal from one node (shown in this example as eNodeB1) to another node. This construct has a variable part and a fixed part. The variable part depicted in bold is used to define any external message of a 3GPP system protocol. By way of example, Table 1 following describes variable parts of the construct and how they are further detailed or defined in the resultant emulation system for network testing.

The variable part provides the polymorphic capability of the system and allows testing personnel to incrementally add to the system. This allows adding new messages, interfaces, and nodes, as variable parts for example. It also allows flexible adaptation to changing 3GPP specifications. In this way, the framework of the system does not change with every new software release and the system can be incrementally built by adding new test cases for new nodes and messages to the existing system.

For any particular test environment, language constructs are predefined. The user is provided with templates which can be edited with the help of a text editor. In order to adapt testing to a particular execution environment, the user can simply modify existing templates.

New language constructs can be introduced in order to bring more capability in the system and provided with rules of use for expanding the capability for testing and emulation.

TABLE 1

Variable Parts of Language Construct

| Variable Part | Description |
| --- | --- |
| S1AP | 3GPP Application Protocol. References 3GPP signaling protocol for communication between radio and mobility management entity of 4G network. |
| S1_SETUP_REQ | Specific message of S1AP protocol. References 3GPP message of above-mentioned protocol. Exchange initial setup data between radio and mobility management entity, i.e. radio entity configuration parameters |
| S1-MME | 3GPP reference interface. Defines a 3GPP reference point for control plane signaling between radio entity and mobility management entity. |
| eNodeB1 | Defines radio entity node as Base Station in 3GPP parlance; this is node that mobile handset communicates with to use mobile network. |
| MME | Defines Mobility Management Entity Node (3GPP). This node facilitates mobile handset mobility by granting access, tracking user location, and managing subscription information of mobile handset subscriber. |
| global_enb_id.plmn_identity.mcc | Defines Mobile Country Code Information Element used by eNodeB1 to inform MME about location country. |

Each one of the variable parameters is defined as part of a separate configuration schema. The language construct gives the user of the emulated system a high-level view of details that a 3GPP domain expert would look for in order to use the emulation. The underlying transport mechanism and the implementation details are hidden from the user.

The other variable parts of the construct are used to define the elements that form the message. A similar construct, shown in FIG. 3B, is used to depict the act of receiving a message from a source and destination node.

It can readily be seen that the variable part of the construct has not changed and the fixed part depicts the act of receiving and validating an external message with its variable elements. Using these language constructs, it can be understood that the ability to integrate newer protocol stacks can be done at a rapid pace, all while maintaining conformance to the protocol speciation of the resultant emulated system. The emulated system must have the capability of integrating, in an efficient and timely manner, new language constructs that might be required over a period of time.

Given a method of constructing and then sending and receiving external messages, the larger part of the problem is that of emulating the larger system, such as a global cellular network.

The language construct allows for messages to be sent from one node to another or to be received at one node on another. Individual nodes can be simulated or, alternately, one or more nodes can be real. When both nodes are simulated, then it suggests a part of the test case that is not present in the real system that is being tested. When one of the nodes is real, then it suggests a part of the test case that is present as the real system.

Test cases are written with the intent of capturing an end-to-end system, which may consist of a set of many nodes. A subset of these nodes can be presented as the real system. When executing a test case, the system is aware of which nodes of the set are real and which are simulated, and executes appropriately.

Call Flow

An assembled group of language constructs, such as those described above, constitute what is known as a call flow in 3GPP Telecom Networks. A set of call flows represents a particular behavior of a system. Different call flows, when written using the above set of language constructs, can be used to emulate the external behavior of all nodes of the actual system. Groups of call flows can then be used to emulate parts of the external system that need to be in place before the implementation of the real system. New call flows can be added to the existing set in order to support new requirements. The complete set of language construct call flows can then be said to comprise all of the features of the global cellular network as defined by the 3GPP specifications.

Figure 4A:
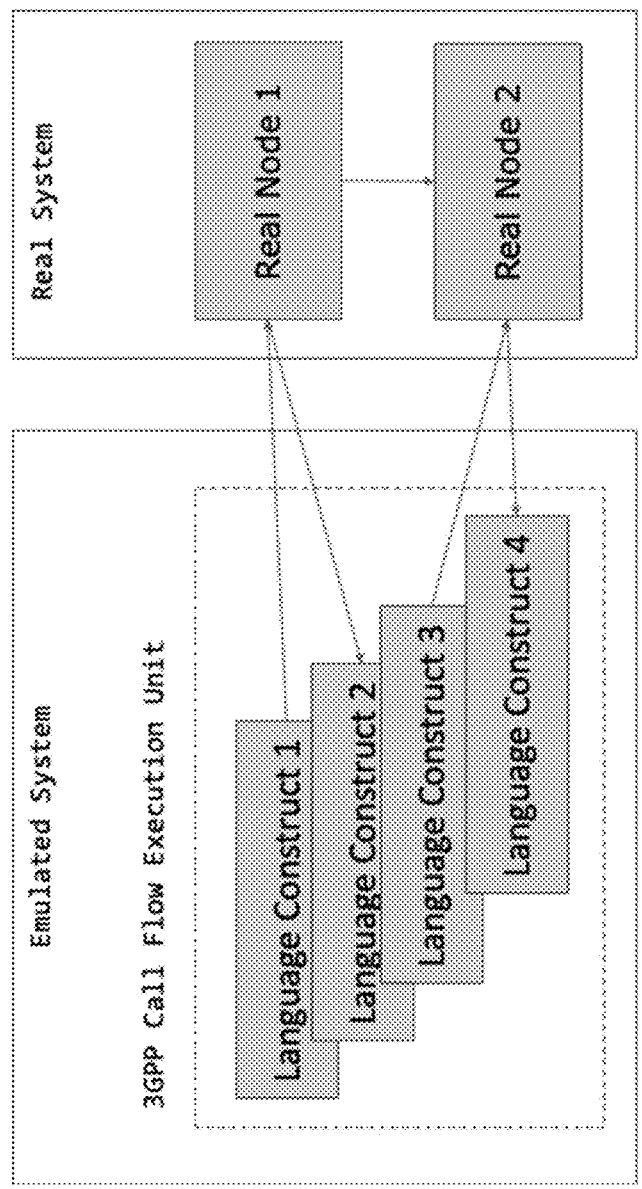
FIG. 4A is an illustration of the emulated solution using the language constructs and showing message exchange using the construct relationships with the various system nodes.

FIG. 4A is an illustration of the emulated solution using the language constructs and showing construct relationships with the various system nodes.

Without using language constructs, emulation would require implementing the complete state machine of the real nodes, as was described with respect to the example of FIGS. 1 and 2. While such an approach is feasible, it does not address the need for rapid development of the emulation system. Moreover, the adaptability of the emulated system to support future requirements is greatly reduced. Furthermore, it is not integrated with a Test Orchestrator that is aware of the Test being executed, integrated with the test data repository, and conscious of the DUT behavior being validated. In order to support ongoing requirements in the rapidly changing 3GPP cellular world, one would need a more agile set of tools that is capable to supporting future requirements without radical changes in software architecture.

The emulated system using Language Constructs must also be capable of supporting well known computer node communication standard implementations, such as TCP/IP implemented in the Linux OS. In order for this to be possible, the resultant emulation system must be able to transport packets using the underlying transport mechanism of the network and the Operating System that it runs on. The emulated system must also be capable of replacing the existing TCP/IP transport layer with a different transport layer technology such as DPDK (Data Plane Development Kit) or SR-IOV (Single root input/output virtualization).

Replacement of one transport layer with another typically represents a significant change in software architecture. There can be tight coupling between the transport layer and the session and presentation layer of the application, as defined according to the Open Systems Interconnection model (OSI model). The OSI model conceptually characterizes and standardizes communication functions of a telecommunication or computing system, without regard to underlying internal structure and technology.

Examples of such tight coupling include direct calls to kernel API from session and presentation layers that can impact portability in cloud environments. Such architectures also delay the adoption of new cloud scale technologies like DPDK and SR-IOV. However, the language constructs used as described herein allow for well-marked boundaries in the architecture and allow for reduced levels of coupling between the different layers of the resulting system, thus allowing for the adoption of cloud scale technologies such as DPDK or SR-IOV. This is possible without increasing the relative time to adopt new technologies due to legacy architectural constraints.

Figure 4B:
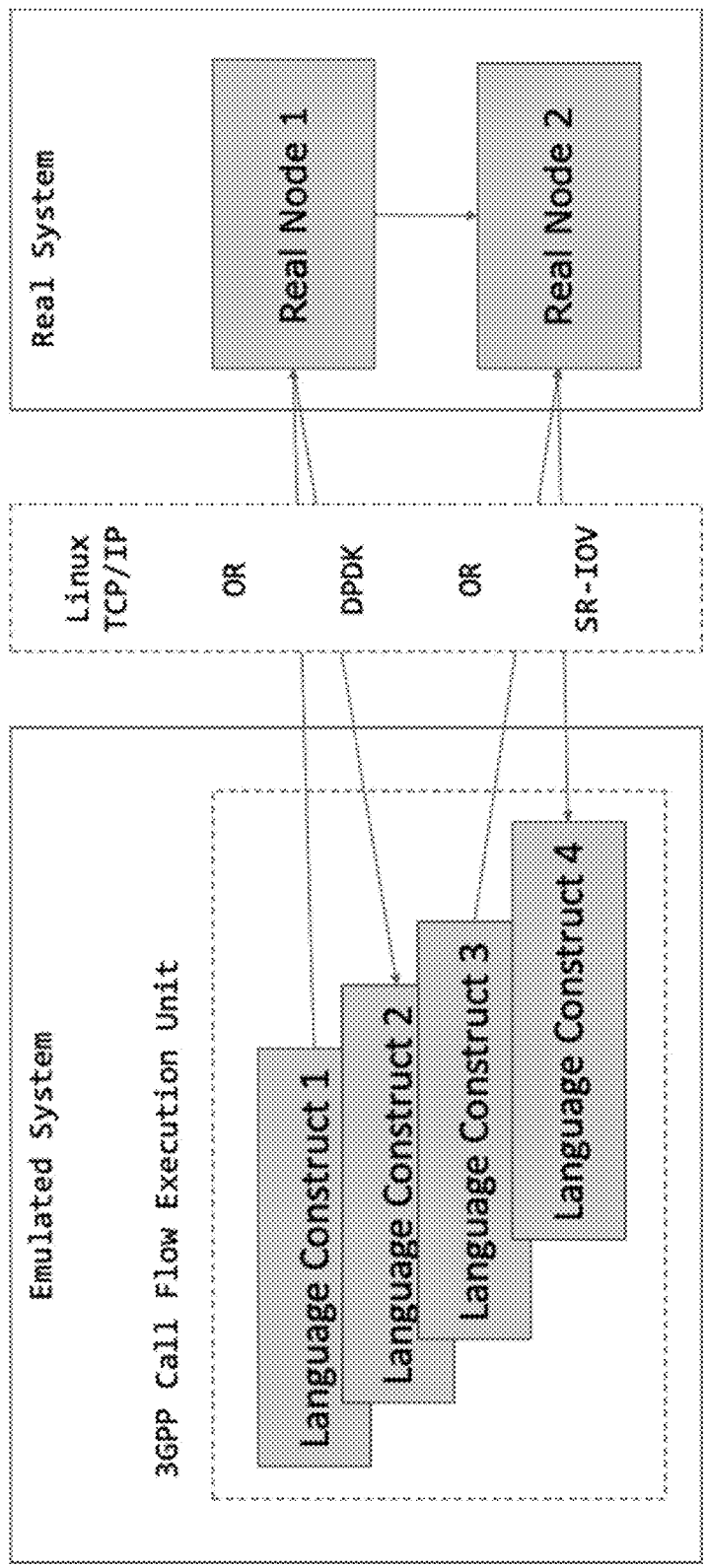
FIG. 4B is an illustration of the resultant architecture working through various interfaces, including cloud-based technologies.

FIG. 4B is an illustration of the resultant architecture working through various interfaces, including cloud-based transport layer technologies.

Apart from the capability to adapt to the new requirements in terms of new external messages and call flows and the ability to adopt new transport layer technologies, the emulated system must also address the ability to provide for high session volume and individual session throughput in a cloud-native environment. By implementing the system in well-defined compartments, the emulation can be broken down into micro-services in order to provide for a key system characteristic, that is, for its ability to scale.

Along with the ability to scale, the emulated system must be capable of integrating with a cloud orchestrator in order to provide lifecycle management functions. The emulated system must be capable of presenting the user with KPIs that are relevant and aid in the measurement of the key parameters that will ultimately decide the viability of the actual system. In the context of 3GPP application protocols, the KPI visualization requirements are significant in number and change over a period of time. The emulation system must be capable of visualizing these changes in KPIs in a rapid manner. Once again, the language constructs aid in the generation of new KPIs and changes in existing KPIs.

Figure 5:
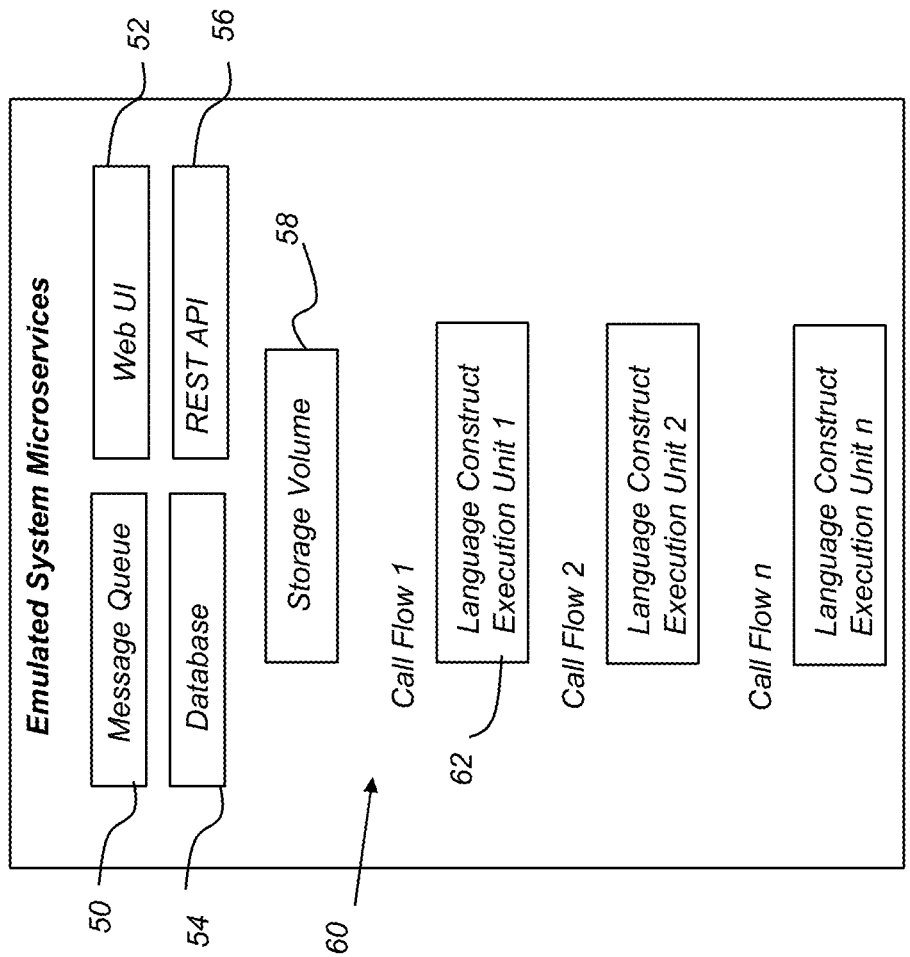
FIG. 5 shows the use of natural language emulation in a micro-services architecture.

FIG. 5 shows the use of natural language emulation in a micro-services architecture. An understanding of the role of the language constructs allows an envisioning of an emulation system that can be built on this basis. This system would meet the criteria for a competent emulation system that can be used to emulate 3GPP cellular networks worldwide. Microservices include a message queue 50, Web user interface (UI) 52, a database 54 for KPI and configuration parameters, and a REST (Representational State Transfer) API 56. Web user interface (UI) 52 can provide tools for editing language constructs and test cases. REST API 56 can provide cloud orchestrator integration capability. A storage volume 58 can also be provided for storing language construct configuration schema. A call flow 60 can be executed by a language construct execution unit 62. This arrangement can provide cloud-based auto-scaling capability.

Figure 6:
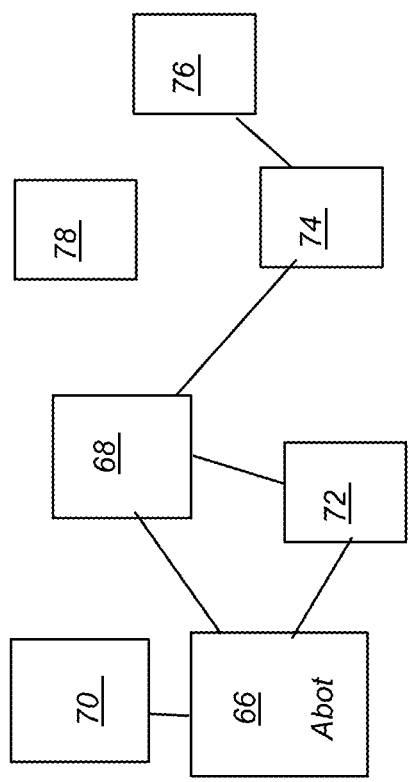
FIG. 6 shows a diagram depicting an arrangement of networked elements of a solution using the method of the present disclosure.

FIG. 6 shows a diagram depicting networked elements of a lab solution handled as micro-services using the method of the present disclosure. In the lab environment, a language construct emulator 66, labeled ABot, is used to emulate a packet core element to test the nodes identified in the FIG. 6 diagram. The language construct emulator 66 uses different language construct sequences (call flows) to test the network system. A node 68 has an open-source implementation of a 3GPP MME (Mobility Management Entity) node. A docker registry 70 contains the microservice container images for the language construct emulator. A node 72 can have an open-source implementation of a 3GPP SPGW (Secure Packet Data Gateway) node. A node 74 can have an open-source implementation of a 3GPP HSS (Home Subscriber Server) node. An open-source database 76 can maintain subscriber information. An open-source node 78 can serve for CI/CD (continuous integration/continuous delivery) purposes. Any of the nodes can include a processor and a display in signal communication with the processor, wherein the processor is useful as a mechanism for initiating and tracking test execution. An emulated node can serve as a processor for testing and monitoring network interaction as well as for display of test results.

FIG. 7 shows exemplary use of language constructs that are used to execute the call flows as obtained from the Web UI of the language construct emulator.

Figure 8:
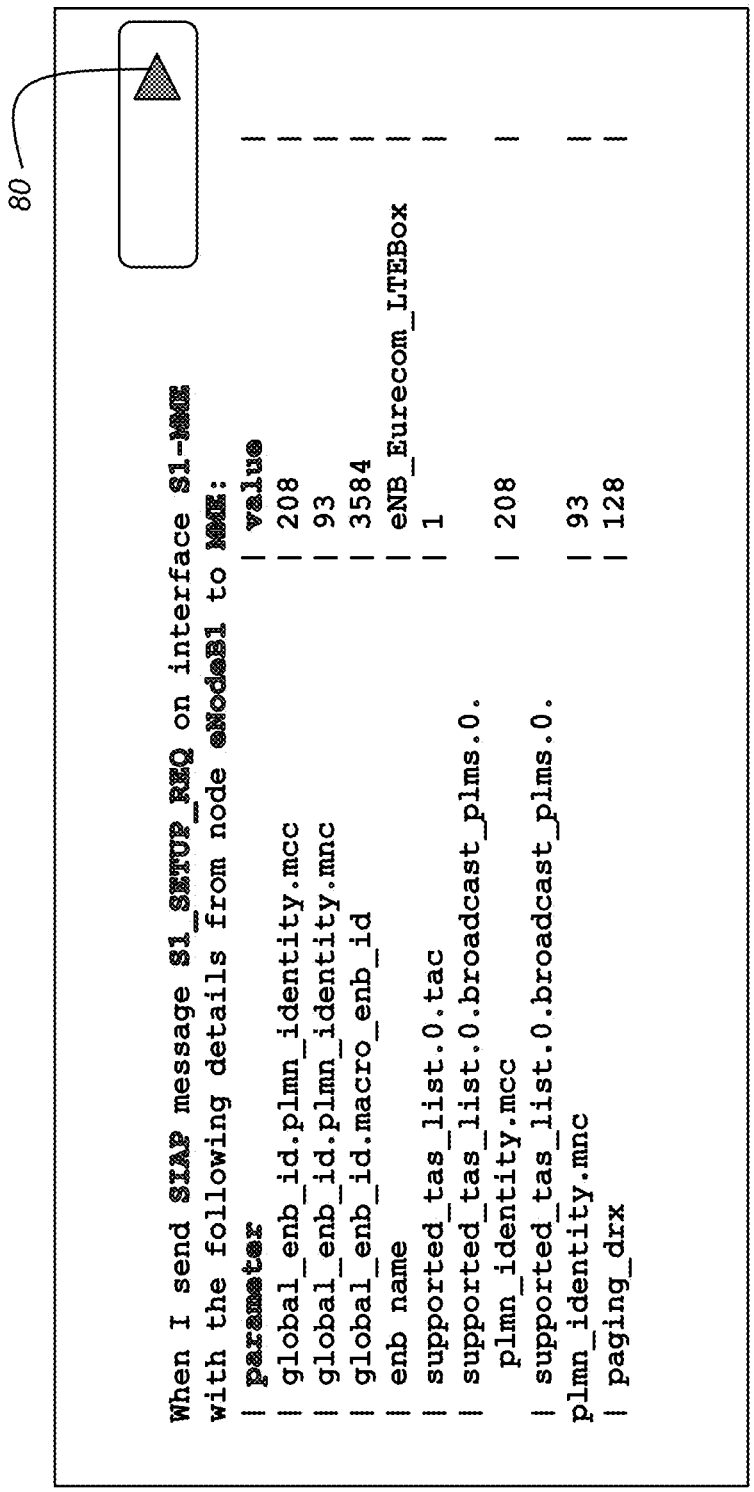
FIG. 8 shows an operator interface for sending a test instruction provided as a language construct.

Call flows can be executed with the help of a GUI interface or with the help of a REST API. The language call flows exist as text files within the emulator and can be viewed with the help of a web interface. While using the web interface, executing a call flow is as simple as executing the language construct text file as shown in FIG. 8, such as by selecting a "play" control 80 when using the operator interface shown.

As the call flow executes, instantaneous KPI can be visualized as shown in the displayed dashboard examples of FIG. 9A-9F. Statistics that can be available can include such counts as packet counts by name of message, transactions per second count, procedures per second count, and downlink and uplink bandwidth. Various types of displayed data can be rendered to the display from a processor that is in signal communication with the display and is configured to automatically execute and track transaction data, as displayed in the FIG. 9A-9F examples.

The graphs of FIGS. 9A, 9B, 9C, 9D, and 9E show example displays that can be rendered on a control console for reporting results for test procedures and transactions to testing personnel. This display rendering can provide graphical representation of vital statistics like transactions per second and bytes per second along with packet counters. These statistics can appear while the test case executes as part of the graphical user interface. Counters can appear in the form of graphs that are rendered to a display, then updated in real time and give feedback about test execution as it proceeds.

Figure 9A:
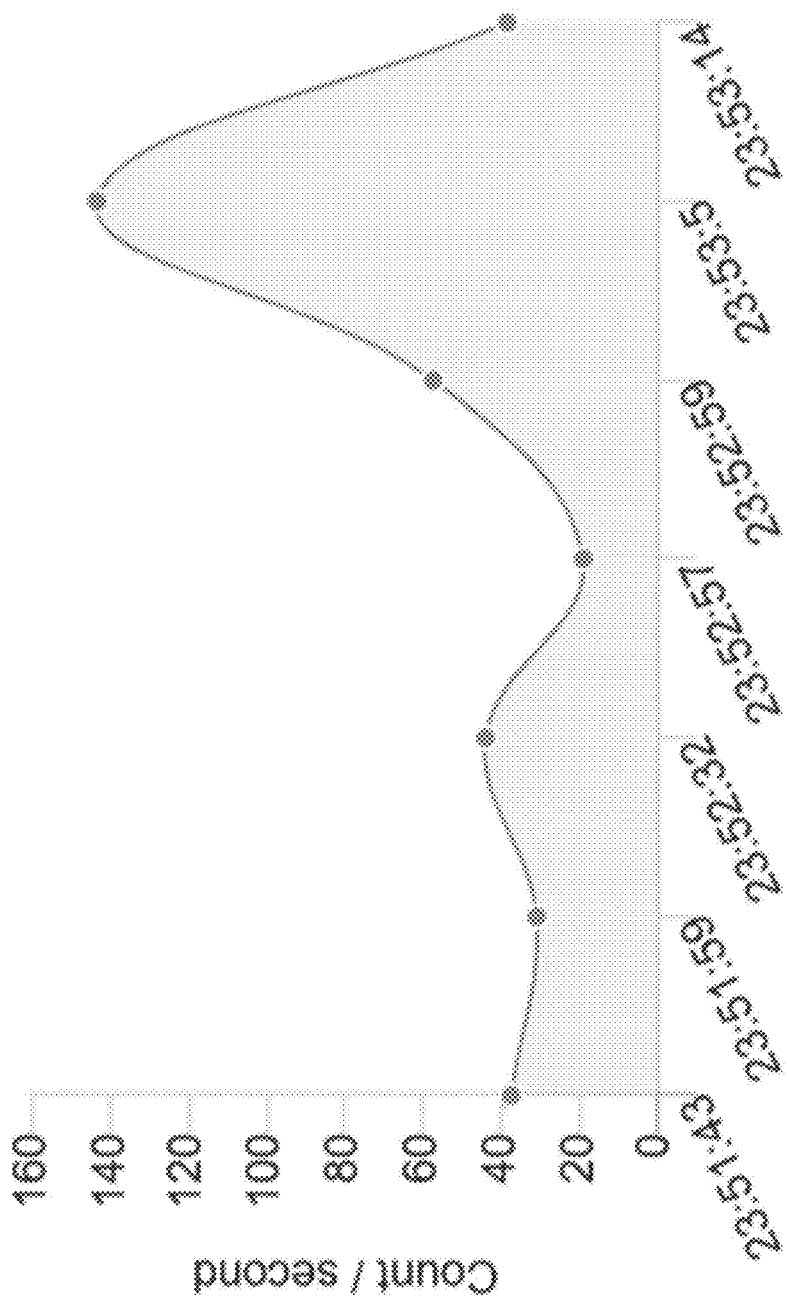
FIG. 9A is a graph that shows an exemplary execution rate over a time interval.

FIG. 9A is a displayed graph that shows an exemplary execution rate, such as bytes per second, over a time interval.

Figure 9B:
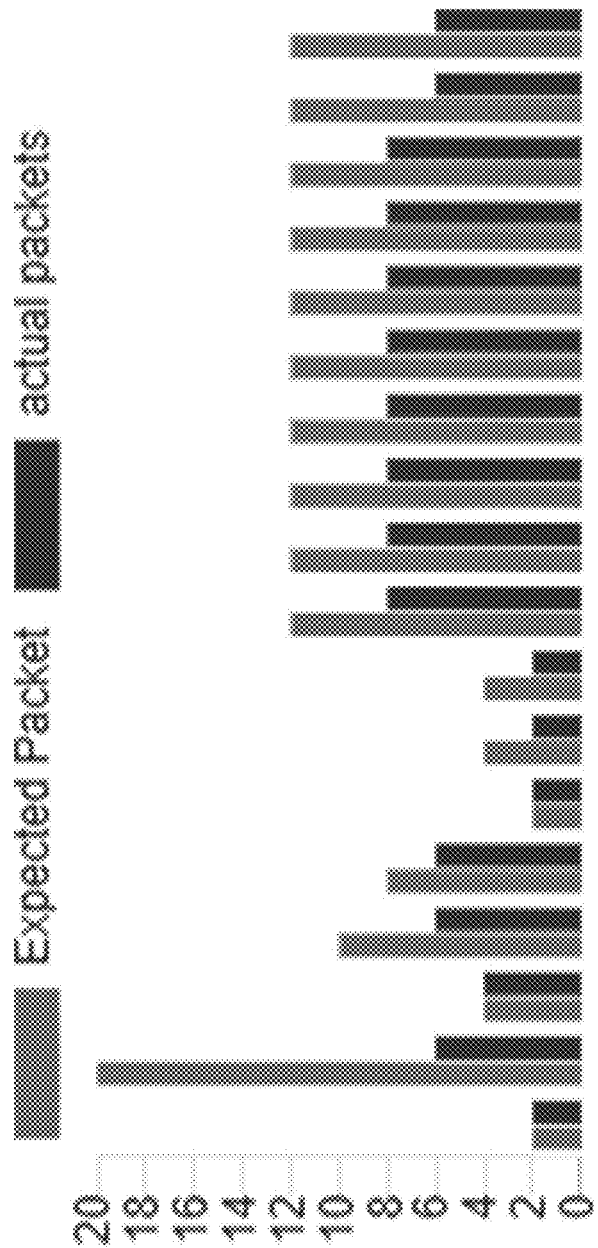
FIG. 9B is a displayed graph that shows an example of expected versus actual packet delivery.

FIG. 9B is a displayed graph that shows an example of expected versus actual packet delivery.

FIG. 9C is an exemplary display that reports procedural results for various steps in an exemplary test sequence. Under a Procedure tab, results can be shown for authentication and context setup. Values for EPS bearer and initial context setup can also be provided.

FIG. 9D shows an alternate display example that applies to a particular operation or "scenario".

Figure 9E:
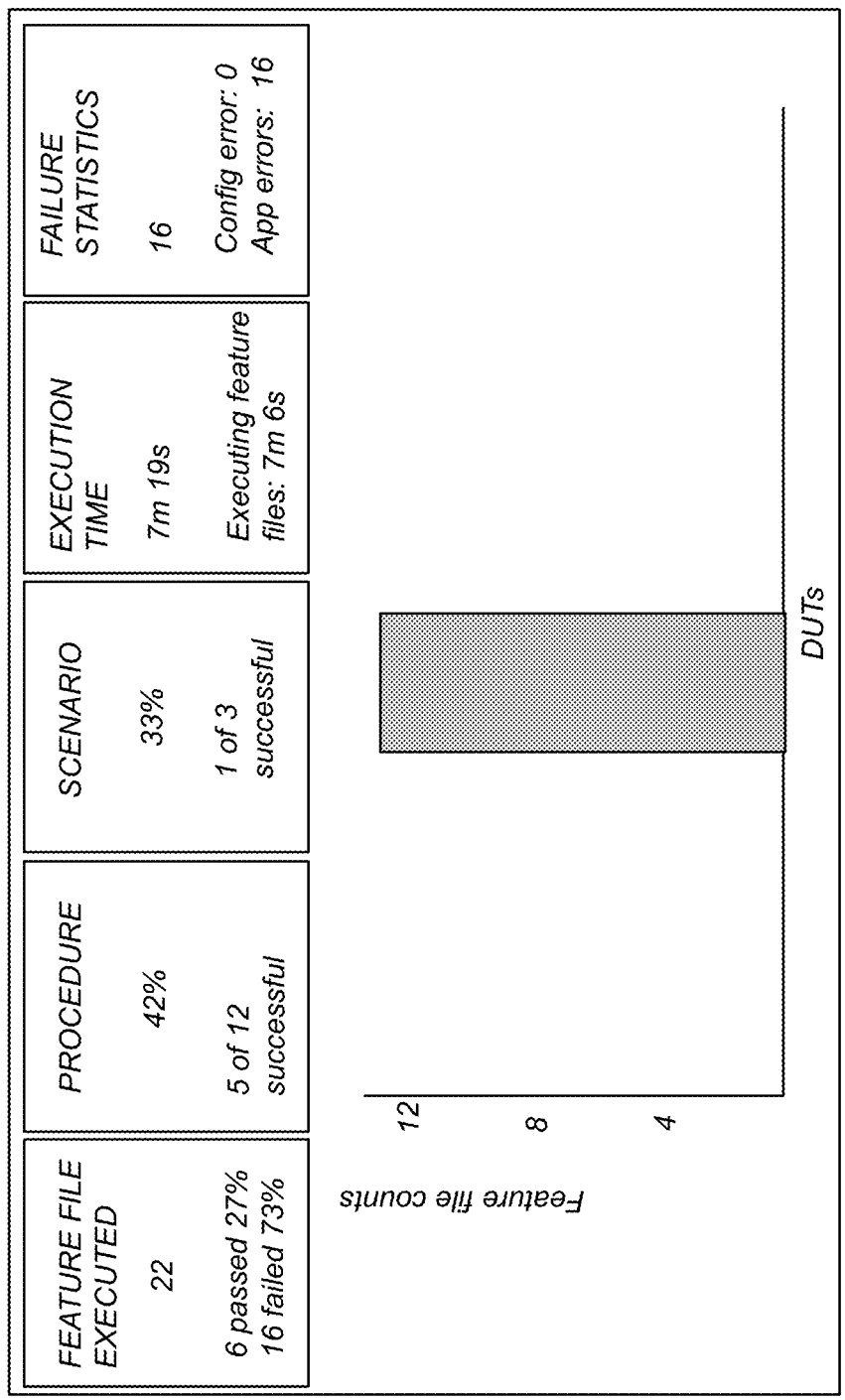
FIG. 9E shows an example of a summary display with statistics for feature file execution.

FIG. 9E shows an example of a summary display showing statistics for feature file execution.

Referring to the display of load statistics given in FIG. 9E, a graph can show feature file count for a particular feature file, or count values for a cumulative number of feature files executed by the system over a given time interval.

According to an embodiment, emulation takes place within a defined environment or container, such as within a particular virtual machine, depending on the underlying virtualization layer. This virtual machine can be part of cluster that is organized/described with the help of Kubernetes orchestration software, Docker Swarm, or can be a docker-compose layer. Thus, the actual emulation environment can be ephemeral and depend on how the container cluster is organized. The containerization technology allocates and deallocates containers at run-time. The nodes that are emulated are provided within the boundaries of these containers and exist only for the duration of a test case.

When language constructs are used in the context of Telecom protocols, they define a test case with messages and nodes. The lower level software written for test cases is decoupled from the actual implementation of the protocol stacks that are required to transport the messages between the nodes. Thus, the underlying implementation can change without changing the test cases. This method of designing test cases eliminates the need to construct a state machine for system emulation. For any particular node, each test case emulates only that portion of the state machine which is exercised by a particular use case. This flexibility of emulating a Telecom protocol state machine using this method, decoupled from the implementation of the underlying protocol stack, provides significant flexibility for testing personnel.

The Applicants have disclosed a method for testing a system having a plurality of network nodes, the method comprising:

providing, for each of the one or more nodes, an emulator that is configured to repeatedly:
- a) accept an operator instruction encoded in a natural language construct;
- b) respond to the accepted instruction according to predetermined model behavior for the emulator; and
- c) record and report the interaction in statistical data displayed to the operator;

and execute programmed emulator instructions and update displayed results under operator control.

The Applicants have disclosed a method for testing a system having a plurality of network nodes, the method comprising:

providing an emulator for one or more of the network nodes;

defining a message transfer sequence between the emulator node and a second network node using a set of instructions generated in natural language form;

initiating the message transfer sequence for execution; and recording statistical data related to the message transfer sequence as executed and displaying the statistical data.

The displayed statistical data can be updated continuously as emulator operation proceeds. The emulator behavior and behavior of networked resources can be defined using a behavior-driven development features file.

The invention has been described in detail with particular reference to certain preferred embodiments thereof, but it will be understood that variations and modifications can be effected within the spirit and scope of the disclosure. Invention is defined by the appended claims.

The invention claimed is:

1. A method for testing network interaction, the method comprising:
(a) defining a plurality of 3GPP network nodes in a 4G or 5G network, wherein the network nodes comprise a plurality of processors that are located at different geographical sites, and that are in 3GPP protocol signal communication with each other;
(b) defining a finite state machine with a set of finite states and state transitions for validating interactions between processors defined as 3GPP network nodes;
(c) configuring a first processor as a language construct emulator configured for emulation of the defined state machine for generating a sequence of call flows among the plurality of 3GPP network nodes according to a scripted sequence;
(d) identifying a first network node, a destination network node and a first intermediate network node that is separate from the first and destination 3GPP network nodes in the 3GPP network;
(e) verifying call flow routing by repeating (i)-(iv) for a plurality of call flows in the scripted sequence:
  (i) initiating a test call flow that transfers message content between the first network node and the destination network node, wherein the test call flow transfers the message content through at least the first intermediate node;
  (ii) detecting and recording network node data related to call flow transitions at one or more nodes in the test call flow between finite states in the defined set of finite states;
  (iii) verifying 3GPP message transfer according to the recorded data;
  (iv) assigning another network node to serve as the destination network node and reassigning a different call flow in the plurality of call flows as the test call flow and wherein the first intermediate node remains the same;

and (f) rendering the recorded data on a display that is in signal communication with the first processor.

2. The method of claim 1 wherein the scripted sequence of 3GPP call flows is defined in a text file, entered and stored using a text editor, and wherein the scripted sequence of 3GPP call flows conforms to a predetermined template for automated execution of call flow testing.

3. The method of claim 2 wherein the text file specifies commands in a domain-specific language.

4. The method of claim 1 wherein the 3GPP network nodes comprise a cellular phone communications network.

5. The method of claim 1 wherein the network node data comprises execution time.

6. The method of claim 1 wherein the network node data comprises a count of transactions or transaction errors.

7. The method of claim 1 further comprising updating the rendered data during execution of the generated scripted sequence.

8. The method of claim 2 wherein the text file is a feature file.

9. The method of claim 2 wherein the scripted sequence defines one or more conditions for the corresponding call flows.

10. The method of claim 2 further comprising continually updating the display of rendered data.

* * * * *